Sept. 17, 1935.  C. A. FLOOD  2,014,727
TICKET REMARKER
Filed Dec. 27, 1933  3 Sheets-Sheet 1
Fig. 1
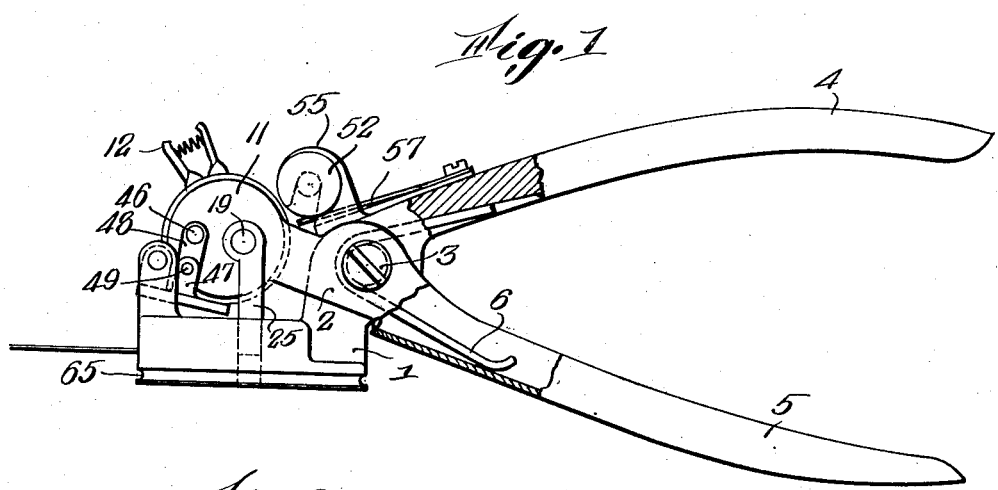
Fig. 2
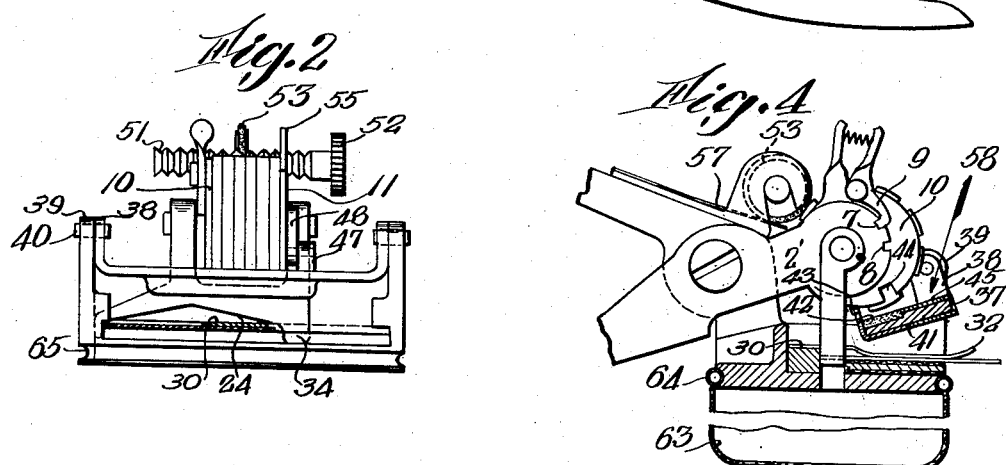
Fig. 4
Fig. 3
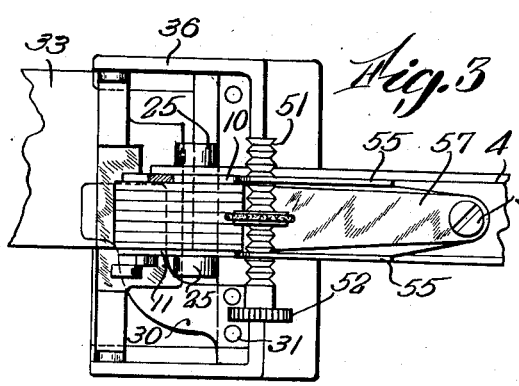
Fig. 5
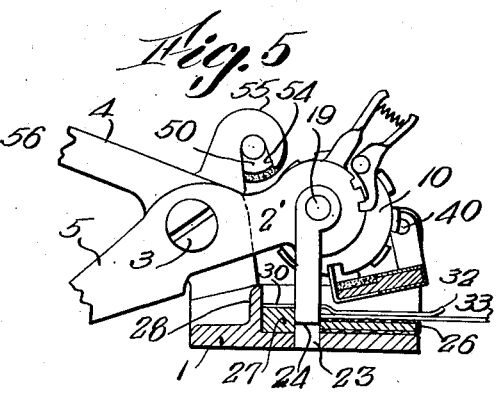
Inventor
Carl A. Flood
by Roberts, Cushman and Woodberry
his Attorneys Sept. 17, 1935.    C. A. FLOOD    2,014,727
TICKET REMARKER
Filed Dec. 27, 1933    3 Sheets-Sheet 2

Inventor
Carl A. Flood
by Roberts, Cushman & Woodbury
his Attorneys

Sept. 17, 1935.                 C. A. FLOOD                 2,014,727
                              TICKET REMARKER
                          Filed Dec. 27, 1933            3 Sheets-Sheet 3
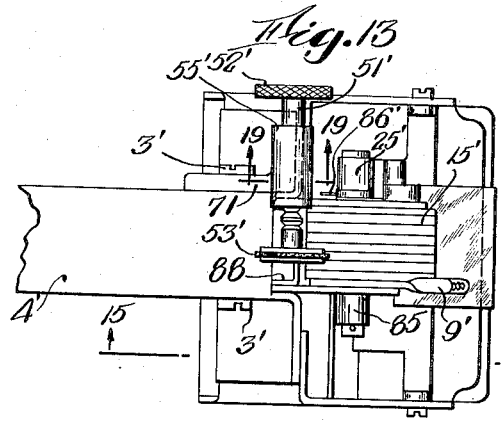
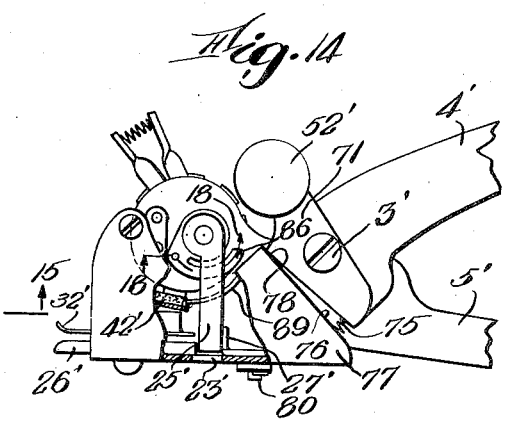
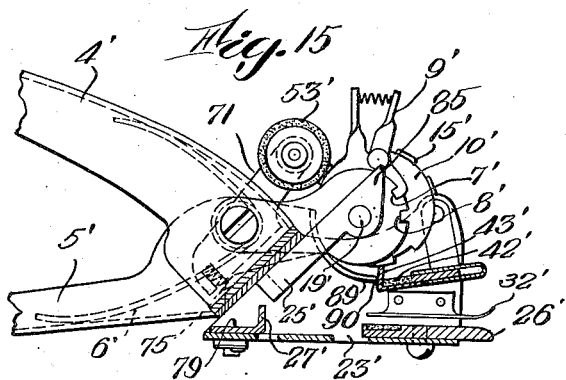
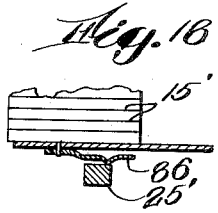
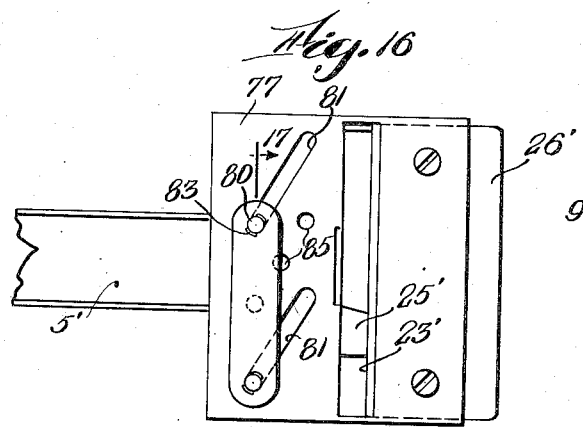
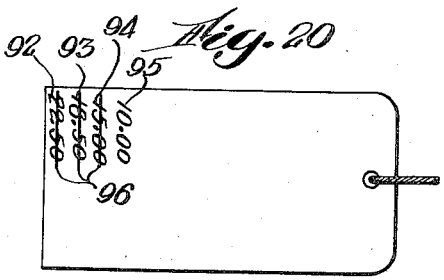
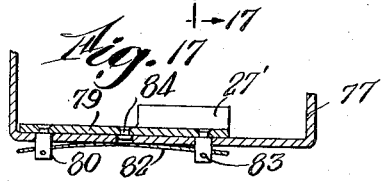

Patented Sept. 17, 1935

2,014,727

UNITED STATES PATENT OFFICE 2,014,727

TICKET REMARKER

Carl A. Flood, Framingham, Mass., assignor to Dennison Manufacturing Company, Framingham, Mass., a corporation of Massachusetts Application December 27, 1933, Serial No. 704,137

22 Claims. (Cl. 101—90)

While the subject-matter of this invention is suitable for a variety of purposes it is particularly adapted for use in remarking price tickets, that is printing new indicia on the tickets and either cancelling or preferably removing a part or all of the indicia already on the ticket. The illustrated embodiments are for use with tickets such as disclosed in my copending application Serial No. 652,467, filed January 19, 1933, where the indicia to be cancelled or removed is on the free end of the ticket, that is the end unattached to the tagged garment or the like, but the parts may be arranged to remove the old indicia wherever located on the ticket.

Objects of the invention are to remove or cancel old indicia and apply new indicia in a single operation, preferably without detaching the ticket from the tagged article, to provide a small portable device which may be quickly and easily applied to tagged garments while hanging on their racks and which may be carried and operated by one hand, leaving the other hand free to insert the tickets into the device, to catch the cut-away portions of the tickets in an attached receiver, and generally to facilitate the remarking of price tickets and the like.

Other objects of the invention are to provide a marking device which can be readily reset to print different indicia, which automatically inks the printing characters, which can not be reset while the ink pad is in contact with the printing characters, which has a reflector to display the printing characters in non-reversed order when the characters are set in operative position, and which is generally superior in compactness, lightness, convenience and durability.

In one aspect the invention involves a device having a space to receive the ticket to be remarked with cutters disposed in opposition on opposite sides of the space, also a printer and platen disposed on opposite sides of the space, together with means for concomitantly producing relative movement between the cutters and between the printer and platen, so as to cut away a portion of the ticket and print another portion in the same operation. The cutters are preferably of the shear type instead of a blade movable toward an abutment; and the platen is preferably a soft pad rather than a hard surface. The space to receive the ticket is preferably aligned with an abutment to stop the ticket in predetermined relationship to the cutter and printer to facilitate the removal of the desired position of the ticket and to locate the new indicia in the space provided for the purpose.

In the preferred embodiment the cutter, printer and platen holders comprise a pair of crossed members pivotally interconnected at their intersection like a pair of scissors or parallel-jaw pliers, the members having handles to be squeezed together on one side of the intersection and carrying the cutters, printer and platen, directly or indirectly, on the other side.

In another aspect of the invention the printer, which is preferably of the type comprising a row of coaxial type wheels (disks or rings), is mounted to shift relatively to its holder from normal position to a resetting position, the preferred means for controlling the printer being arranged as follows. The resetting device is mounted in fixed (but adjustable) relation to the platen holder in the path of the printer in the movement of the printer holder away from the platen holder, so that the printer may be brought into engagement with the resetter in said movement. However, in the normal operation of the device a stop is provided to limit this movement so that the printer stops short of the resetter, this stop preferably comprising a part of the inking device which contacts the printer at the end of said movement. The printer is shiftable on its holder from normal position to a resetting position in which it does not stop short of the resetter but engages the latter at the end of its movement away from the platen; and the means for shifting the printer is arranged to interlock with the inking device so that the printer can not be shifted to resetting position while the printer is in contact with the inking pad.

Another feature of the invention comprises a reflector for displaying the type set to operative position in non-reversed order to facilitate correct resetting, this reflector preferably being mounted on the inking device to move into operative position when the parts are placed in resetting position.

For the purpose of illustrating the genus of the invention typical concrete embodiments are shown in the accompanying drawings in which:

Fig. 1 is the side elevation with parts broken away;

Fig. 2 is a front end elevation with parts broken away;

Fig. 3 is a top plan view with parts broken away;

Fig. 4 is a side view, opposite to that shown in Fig. 1, with parts broken away and parts in section and with the printer in resetting position;

Fig. 5 is a side elevation similar to that shown in Fig. 4 except that the printer is in normal idle position;

Fig. 13 is a top plan view of a modification;

Fig. 14 is a right end view of the modification with a part broken away;

Fig. 15 is a section on line 15—15 of Fig. 13 showing the parts in position for resetting the type wheels instead of printing position;

Fig. 16 is a bottom plan view of the modification;

Fig. 17 is a section on line 17—17 of Fig. 16;

Fig. 18 is a detail view taken on the line 18—18 of Fig. 14;

Fig. 19 is a section on line 19—19 of Fig. 13; and

Fig. 20 is a plan view of a ticket remarked with the modification shown in Figs. 13 to 19 without cutting off the old marks.

Figure 6:
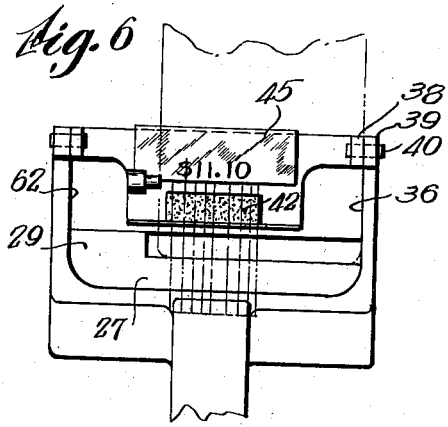
Fig. 6 is a plan view of the platen holder and inking device with the printer indicated in broken lines.
Figure 7:
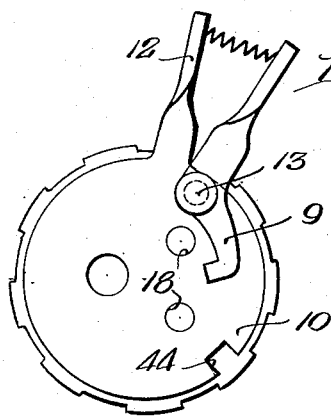
Fig. 7 is an enlarged end elevation of the printer.

The particular embodiment illustrated in Figs. 1 to 12 comprises a platen holder 1 and a printer holder 2 in the form of crossed members pivoted together by a stud 3 at the point of intersection, with handles 4 and 5 on the side of the intersection opposite to the printer and platen and a spring 6 for holding the members apart. The printer holder is bifurcated and the right-hand side 2' is provided with two notches 7 and 8 to receive the end of a pawl 9.

The printer comprises two end disks 10 and 11, the disk 10 carrying a handle 12 adjacent the pawl 9 which is pivoted on the outer face of the disk 10 by means of a pin 13. Disposed between the end disks 10 and 11 is a central core 14 and six type wheels 15 carrying type characters 16 on their outer peripheries. The core 14 is provided with two pins 17 which project into opening 18 in the disk 10, and the core is pivotally mounted on the bifurcated holder 2—2' by means of a pin 19 extending eccentrically through the core. The core is also provided with radial openings 20 to receive spring-pressed detents 21 which cooperate with recesses 22 in the inner peripheries of the type wheels to hold the wheels in adjusted position.

Figure 10:
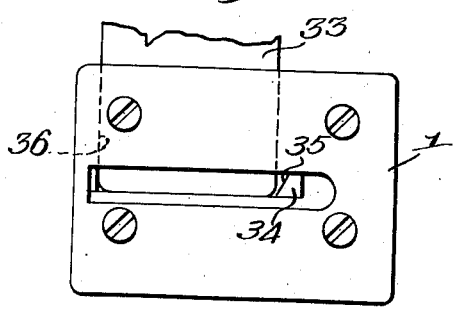
Fig. 10 is a bottom plan view of the device.
Figure 9:
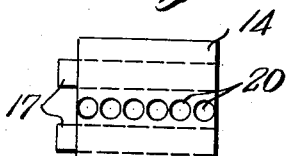
Fig. 9 is a side view of the core of the printer.

The platen holder 1 is provided with an elongate cutter opening 23 through which operates a cutter 24 supported on the ends of pins 19 by means of arms 25. The platen holder 1 also carries a platen 26 on its upper surface in front of the opening 23. A ticket stop 27 in the form of a filler piece is mounted on the upper surface of the platen 1 between the opening 23 and an upstanding flange 28 with a forwardly extending portion 29 (Fig. 6) extending along the left-hand end of the opening 23. A spring 30 is mounted at its rear end on the piece 27 by means of screws 31, the spring curving forwardly and inwardly around the cutter with an upturned lip 32 at its forward end, the forward central portion of the spring 30 being juxtaposed to the platen 26 yieldingly to hold a ticket 33 on the platen when the ticket is inserted under the lip 32 from the front. Inasmuch as the stop 27 extends above the level of the ticket (Figs. 4 and 5) the forward edge of the ticket will engage the stop when the ticket is inserted as aforesaid. As shown in Figs. 2, 4 and 5 the right-hand end of the cutter has a downward extension 34 which projects past the plane of the ticket when the cutter is in retracted position; and as shown in Fig. 10 the inner face of this extension is beveled at 35 to cam the ticket against the flange 36 at the right-hand end of the platen holder, thereby to assist in inserting the ticket with its forward edge parallel to the cutting edge of the cutter.

The inking device comprises a bail 37 having its arms 38 pivotally mounted on the upstanding lugs 39 of the platen holder by means of pins 40, and a sheet metal frame 41 mounted on the central portion of the bail 37. The frame 41 carries an inking pad 42, a projecting lug 43 cooperating with a notch 44 in the disk 10 and a reflector 45. The inker is pivotally interconnected with the printer through a pin 46 on the disk 11, an upstanding lug 47 on the inker and a link 48 extending between the pin 46 and a pin 49 on the lug 47. Thus when the printer and platen move apart the inking pad swings against the particular row of type characters on the printing wheels which are adjusted to printing position, as shown in Fig. 5; and when the printer and platen approach each other to print the ticket the inker swings forwardly about the pivots 40 out of the way. When the inking pad is against the type characters as shown in Fig. 5 the lug 43 extends into the recess 44 so that the printer can not be swung from the normal idle position shown in Fig. 5 to the resetting position shown in Fig. 4, thereby guarding against damage to the pad. To make this shift of the printer the handles are squeezed toward each other far enough to swing the ink pad away from the type characters and to withdraw the lug 43 from the notch 44, whereupon the printer may be swung about the eccentric pivot 19 by disengaging the pawl 9 from the notch in portion 2' of the printer holder.

While the type wheels may be reset by engaging the peripheries of the wheels with the point of a pencil or other suitable instrument, I preferably provide resetting means in the form of a roller 50 mounted on a shaft 51 carrying a knurled wheel 52 on its left-hand end, the roller 50 preferably being provided with a soft rubber annulus 53 on its periphery. The shaft 51 extends through flaring notches 54 in the two upstanding flanges of a U-shaped bracket 55 mounted on the holder 4 by means of a screw 56 which also holds a spring 57 against the under side of the wheel 50. The shaft 51 is provided with V-shaped grooves so that endwise pressure causes the shaft to move downwardly in the flaring notches 54 against the action of the spring 57 until the edges of the grooves snap past the flanges 55, whereupon the spring 57 again lifts the shaft 51 to the normal position wherein the bottoms of the grooves meet against the bottoms of the notches 54. Thus the roller 50 may be readily adjusted into contact with the peripheries of the wheels successively to adjust the wheels to new printing position. Before shifting the roller 50 from one type wheel to another the handles are squeezed toward each other to afford sufficient clearance between the roller and wheels. By virtue of the mirror 45 the printing characters may be viewed in non-reversed order as they are brought into printing position by looking down on the device along the arrow 58 (Fig. 4) during the resetting operation.

Figure 11:
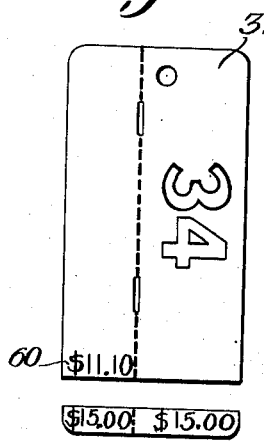
Fig. 11 is a plan view of a ticket which has been remarked on one of its two detachable portions, with the original mark cut off.
Figure 12:
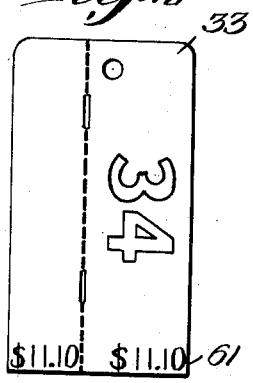
Fig. 12 is a similar view showing both portions of the ticket remarked.
Figure 8:
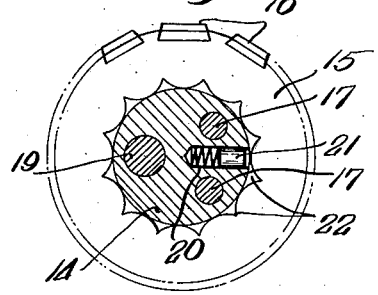
Fig. 8 is a central sectional view of the printer.

To operate the device the printer is moved to the position where the pawl 9 seats in notch 8, the ticket is inserted to the position shown in Figs. 4, 5, 6 and 10 and the handles 4 and 5 are squeezed together. As the printer and platen approach each other the foremost end of the ticket is cut off (as shown in Fig. 11) by the forward edge of the cutter; and the ticket is remarked (as shown at 60 in Fig. 11) as the forward end of the ticket is squeezed between the printer and platen. If it is desired to remark the ticket in the second location shown at 61 in Fig. 12 the ticket is then shifted to the left until the left-hand edge of the ticket engages the left-hand flange 62 of the platen holder, the forwardly projecting portion 29 of the stop 27 (Fig. 6) serving to maintain the forward edge of the ticket in the same vertical plane as before, and the handles 4 and 5 are again squeezed together. During this second printing operation the cutter performs no function for the reason that the ticket is held out of the path of the cutter by the projections 29 of the stop 27.

For the purpose of catching the cut-off ends of the ticket the platen holder may be provided with a suitable receiver. Thus Fig. 4 shows a flexible bag 63 having an elastic corded edge 64 detachably seating in a groove 65 extending around the platen holder.

The modification illustrated in Figs. 13 to 19 inclusive is similar to the embodiment shown in Figs. 1 to 12 inclusive and corresponding parts are correspondingly designated. However the modification differs from the preceding embodiment in the following respects:

The grooved shaft 51' carrying the type resetting wheel 53' is mounted in a cylindrical bearing 55' on the upper end of a bracket 71 and the resetting wheel 53' is held in various adjusted positions longitudinally of the axis of the shaft by means of a plunger 72 pressed by spring 73 into one of the grooves of the shaft 51' (Fig. 19). Inasmuch as the ridges between the grooves in the shaft 51' are approximately equal in diameter to the bore in the bearing 55' the shaft 51' is held against sidewise movement as it is axially adjusted.

As shown in Figs. 13, 14 and 15 the bracket 71 which carries the type adjusting roller 53' is pivotally mounted on the side of the handle 4 by means of the pivot pin 3' so that the wheel 53' may have limited swinging movement toward and from the type wheels 15'. A spring 75 interposed between the tail end of the bracket 71 and the rear face 76 of the frame 77 tends to swing the bracket 71 about the pivot pin 3' in a counterclockwise direction (Fig. 14) and a nose 78 on the bracket 71 is arranged to seat against the base 76 to limit the extent of this counterclockwise swinging.

As in the previous embodiment the type wheels 15' are shifted into contact with the setting roller 53' by disengaging the holding pawl 9' from the recess 8', swinging the type wheels in a counterclockwise direction about the shaft 19' and permitting the detent 9' to snap into the recess 7', this shifting of the type wheels from printing position to resetting position being effected while the handles 4' and 5' are partially squeezed together to keep the type wheels in an intermediate position out of contact with the resetting roller 53' on the upper side and out of contact with the ink pad 42' and the stop 43' on the under side. After the detent 9' has been shifted from the recess 8' to the recess 7' the handles 4' and 5' are released sufficiently to permit the main spring to separate the handles to fully separated position which is limited by the stop 43' engaging the periphery of the end disk 10' (Fig. 13). As the type wheels approach this limiting position they contact with the resetting roller 53' and swing it in a clockwise direction (Fig. 14) against the action of spring 75. Thus, when the stop 43' engages the disk 10' the action of the main spring 6' is arrested and thereafter the pressure between the roller and the type wheels is limited to the force of the auxiliary spring 75. In this way the pressure between the resetting wheel 53' and the type wheels is limited, during the resetting operation, to the proper degree, less than that of the main spring, determined by the strength of the auxiliary spring 75.

In the modification shown in Figs. 13 to 19 the stop 27' for limiting the extent to which a ticket may be inserted into the space between the guide 32' and the platen 26' is in the form of an upturned flange 27' on a plate 79 sliding over the bottom of the sheet-metal frame member 77. The plate 79 carries two pins 80 which project through oblique slots 81 in the frame member 77 and thence through openings in a bow spring 82, their lower ends having transverse openings to receive wire detents 83 bearing against the lower faces of the spring 82. Inasmuch as the central portion of the spring 82 bears against the under side of the frame member 77 the tendency of the spring to straighten yieldingly urges the plate 79 downwardly against the upper surface of the frame member 77. Intermediate the pins 80 the plate 79 is provided with a pin detent 84 adapted to seat into any one of three openings 85 in the frame member 77, the openings 85 being arranged in a row parallel to the oblique slots 81. To shift the ticket stop from one position to another the pins 80 are pressed upwardly against the action of spring 82 until the stop pin 84 is lifted out of the opening 85, whereupon the ticket stop may be shifted longitudinally of the grooves 81 until the pins 84 snap into another one of the openings 85. In Fig. 14 the ticket stop is shown in fully advanced position wherein the pin 84 extends through the opening 85 nearest to the cutter opening 23', while in Figs. 15, 16 and 17 the ticket stop is shown in its fully retracted position.

When the ticket stop 27' is in the fully advanced position shown in Fig. 14 it serves as a guide for the cutter 25' but when it is moved to the fully retracted position shown in Figs. 15 to 17 the cutter 25' is free to swing from the operative position shown in Fig. 14 to the inoperative position shown in Fig. 15. The upper end of one leg of the bail-shaped cutter is provided with a projection 85 which serves as a handle for swinging the cutter from one position to the other. As shown in Figs. 13 and 18 a spring 86 is associated with the other leg of the bail-shaped cutter for yieldingly holding the cutter in the retracted position shown in Fig. 15. After the cutter has been swung to retracted position the ticket stop 27' may again be advanced either to the forward position shown in Fig. 14 or to the intermediate position determined by the middle opening of the three openings 85.

Mounted on the pivot pins 3' intermediate the two sides of the channel-shaped handle 4' is a U-shaped bracket 88, the web of which has an extension 89 curving downwardly and forwardly (Fig. 15) under the type wheels, and on the lower end of this extension is a transverse ridge 90 which serves to cancel an old price mark when the cutter is swung to retracted position so as not to cut off the old mark. As shown in Fig. 14 the cancelling ridge 90 is contacted by the inking pad 42' when the pad moves against the type wheels and when the handles 4' and 5' are squeezed together to print a ticket the portion projecting over the opening 23' is marked by the cancelling ridge 90, it being understood that unless the cutter is in retracted position this portion of the ticket would be cut off and therefore not marked by the cancelling ridge.

In using the modification of Figs. 13 to 19 to cut off the old price when printing a new price, the ticket stop 27' occupies the forward position shown in Fig. 14, where it also serves as a guide for the cutter, the operation being similar to that of the embodiment shown in Figs. 1 to 12. When the ticket cutter is moved to inoperative position the operation of the device is as follows. To remark a ticket the first time the ticket stop 27' is moved to the forward position shown in Fig. 14; to remark a ticket the second time the stop is moved to intermediate position; and to remark a ticket the third time the stop is moved to the retracted position shown in Figs. 15, 16 and 17.

Referring to Fig. 20, showing a ticket which has been remarked three times, 92 is the original marking, 93 is the first remarking, 94 is the second remarking and 95 is the third remarking. Each time the ticket is remarked the next previously applied marking is cancelled by a line such as shown at 96, these lines being printed by the cancelling ridge 90. Thus, in using the modification of Figs. 13 to 19, the last applied mark may be cut off when a new mark is applied, or the previously applied mark may merely be cancelled in applying new marks.

It should be understood that the present disclosure is for the purpose of illustration only and that this invention includes all modifications and equivalents which fall within the scope of the appended claims.

I claim:

1. A device for remarking price tickets comprising a pair of holders kinematically interconnected for relative movement toward and from each other, with a space between the holders on one side of said interconnection to receive a ticket from the end of the space remote from the interconnection, a printer and a platen disposed on said holders on opposite sides of said space respectively, and cutters disposed in opposition on said holders respectively intermediate said interconnection and said printer and platen, whereby a ticket inserted in said space may have a portion of its foremost end cut away and a succeeding portion remarked.

2. A device for remarking price tickets comprising a pair of holders kinematically interconnected for relative movement toward and from each other, with a space between the holders on one side of said interconnection to receive a ticket from the end of the space remote from the interconnection, a printer and a platen disposed on said holders on opposite sides of said space respectively, cutters disposed in opposition on said holders respectively intermediate said interconnection and said printer and platen, and a ticket stop intermediate the cutters and said interconnection, whereby a ticket inserted in said space against said stop may have a predetermined portion of its foremost end cut away and a succeeding portion remarked.

3. A device for remarking tickets comprising a pair of crossed members pivotally interconnected at their intersection, with handles on one side of the intersection, a printer and a platen disposed in opposition on said members on the other side of the intersection, an inker pivotally mounted on the platen member, a link interconnecting the inker with the printer member for moving the pad against the printer as the printer moves away from the platen, the printer having movement from normal position to a resetting position, and means on the inker for locking the printer against said movement when the inker is against the printer.

4. A device for marking tickets comprising a pair of holders having relative movement toward and from each other, a printer and a platen disposed in opposition on said holders respectively, an inker movably mounted on one of the members, means on the other member for moving the inker against the printer when the holders move apart, the printer having movement from normal position to a resetting position, and means on the inker for locking the printer against said movement when the inker is against the printer.

5. A device for marking tickets comprising a pair of holders having relative movement toward and from each other, a printer and a platen disposed in opposition on said holders respectively, an inker movably mounted on one of the members, means on the other member for moving the inker against the printer when the holders move apart, the printer having movement from normal position to a resetting position, and means for holding the inker out of contact with the printer when the latter is moved to resetting position.

6. A device for marking tickets comprising a pair of holders having relative movement toward and from each other, a printer and a platen disposed in opposition on said holders respectively, an inker movably mounted on one of the members, means on the other member for moving the inker against the printer when the holders move apart, the printer having movement from normal position to a resetting position, and means for holding the inker out of contact with the printer when the latter is moved to resetting position, the inker having a reflector for displaying the printing characters when thus held out of contact with the printer.

7. A device for marking tickets comprising a pair of holders having relative movement toward and from each other, a printer and a platen disposed in opposition on said holders, means on one of said members for moving the printer from normal position to a resetting position, and a reflector mounted on the other member for displaying the printing characters when set to operative position.

8. A device for marking tickets comprising a pair of holders having relative movement toward and from each other, a printer and a platen disposed in opposition on said holders respectively, the printer comprising a row of coaxial type wheels, eccentric means for swinging the wheels to a resetting position, and a reflector for displaying the character of each wheel which is set to operative position.

9. A device for marking tickets comprising a pair of holders having relative movement toward and from each other, a printer and a platen disposed in opposition on said holders respectively, the printer comprising a row of coaxial type wheels, eccentric means for swinging the wheels to a resetting position, a reflector for displaying the character of each wheel which is set to operative position, and means for resetting the wheels when swung to said position.

10. A device for marking tickets comprising a pair of holders having relative movement toward and from each other, a printer and a platen disposed in opposition on said holders respectively, the printer comprising a row of coaxial type wheels, eccentric means for swinging the wheels to a resetting position, and roller means frictionally engageable with the peripheries of the wheels when the wheels are swung to said position for resetting.

11. A device for marking tickets comprising a pair of holders having relative movement toward and from each other, a printer and a platen disposed in opposition on said holders respectively, the printer comprising a row of coaxial type wheels, eccentric means for swinging the wheels to a resetting position, and means engageable with the peripheries of the wheels when the wheels are swung to said position for resetting, said means comprising a roller shiftable longitudinally of said row into individual engagement with any type wheel.

12. A device for marking tickets comprising a pair of holders having relative movement toward and from each other, a printer and a platen disposed in opposition on said holders respectively, the printer comprising a row of coaxial type wheels, eccentric means for swinging the wheels to a resetting position, and roller means frictionally engageable with the peripheries of the wheels when the wheels are swung to said position for resetting, said roller means being mounted on the platen holder to engage a type wheel when the holders are moved apart and to disengage the type wheel when the holders are moved toward each other.

13. A device for marking tickets comprising a pair of holders having relative movement toward and from each other, a printer and a platen disposed in opposition on said holders respectively, the printer comprising a row of coaxial type wheels, and resetting means fixed with relation to the platen holder for engaging the peripheries of the wheels when the holders are moved apart, said means comprising an actuator shiftable longitudinally of said row for individual engagement with the wheels respectively.

14. A device for marking tickets comprising a pair of holders having relative movement toward and from each other, a printer and a platen disposed in opposition on said holders respectively, the printer comprising a row of type wheels, means for moving the printer relative to the printer holder from normal position to a resetting position, resetting means fixed with relation to the platen holder for engaging the peripheries of the wheels when the holders are moved apart with the printer in resetting position, and means including an inker for stopping the relative movement of the holders from each other before the printer engages said resetting means when the printer is in said normal position on its holder.

15. A device for marking tickets comprising a pair of holders having relative movement toward and from each other, a printer and a platen disposed in opposition on said holders respectively, the printer comprising a row of coaxial type wheels mounted on one holder, a roller adjustably mounted on the other holder for frictional engagement with respective wheels, an auxiliary spring for pressing the roller against the type wheels, a main spring for bringing the type wheels and roller into frictional engagement and then moving the roller against the action of the auxiliary spring, and a stop for then limiting the action of the main spring so that the pressure between the roller and wheels is limited to the force of the auxiliary spring.

16. A device for remarking price tickets, of the type having a space to receive the ticket to be remarked, comprising cutters disposed in opposition on opposite sides of said space respectively, a printer and a platen disposed in opposition on opposite sides of said space respectively, means for concomitantly producing relative movement between the printer and platen and between the two cutters toward and from each other respectively, concomitantly to cut away a marked portion of the ticket and print another portion, and means for shifting one cutter out of operative relation to the other cutter so that tickets may be remarked without cutting away the original mark.

17. A device for remarking price tickets, of the type having a space to receive from one end thereof a ticket to be remarked, comprising means for removing the foremost marked portion of a ticket inserted in said space, means between said means and said end for concomitantly remarking the ticket, and manual shift means for rendering said first means inoperative so that tickets may be remarked without cutting away the original mark.

18. A device for remarking price tickets comprising a pair of holders kinematically interconnected for relative movement toward and from each other, with a space between the holders on one side of said interconnection to receive a ticket from the end of the space remote from the interconnection, a printer and a platen disposed on said holders on opposite sides of said space respectively, cutters disposed in opposition on said holders respectively intermediate said interconnection and said printer and platen, whereby a ticket inserted in said space may have a marked portion of its foremost end cut away and a succeeding portion remarked, and means for swinging one of said cutters out of operative relation to the other cutter so that tickets may be remarked without cutting away the original mark.

19. A device for remarking price tickets comprising a pair of holders kinematically interconnected for relative movement toward and from each other, with a space between the holders on one side of said interconnection to receive a ticket from the end of the space remote from the interconnection, a printer and a platen disposed on said holders on opposite sides of said space respectively, cutters disposed in opposition on said holders respectively intermediate said interconnection and said printer and platen, a ticket stop intermediate the cutters and said intersection, whereby a ticket inserted in said space against said stop may have a predetermined portion of its foremost end cut away and a succeeding portion marked, manual shift means for rendering one of said cutters inoperative so that tickets may be remarked without cutting away former marks, and means for adjusting said stop to any one of a plurality of positions for successive remarkings.

20. A device for remarking price tickets comprising a pair of holders, a printer and a platen disposed on said holders respectively, cutters disposed in opposition on said holders respectively, means for shifting one of said cutters out of operative relation to the other cutter, a ticket stop for holding the shiftable cutter in operative relation to the other cutter, and means for shifting the ticket stop to permit the shiftable cutter to be moved to inoperative position.

21. A device for remarking price tickets comprising a pair of holders, a printer and a platen disposed on said holders respectively cutters disposed in opposition on said holders respectively, means for shifting one of said cutters out of operative relation to the other cutter, a ticket stop for holding the shiftable cutter in operative relation to the other cutter, the ticket stop being adjustable to permit the shiftable cutter to be moved to inoperative position, and means for adjusting the ticket stop to any one of a plurality of operative positions for successive remarkings.

22. A device for remarking price tickets, of the type having a space to receive the ticket to be remarked, comprising cutters disposed in opposition on opposite sides of said space respectively, a printer and a platen disposed in opposition on opposite sides of said space respectively, means for concomitantly producing relative movement between the printer and platen and between the two cutters toward and from each other respectively, concomitantly to cut away a marked portion of the ticket and print another portion, means for cancelling a mark on the ticket, and means for rendering the cutters inoperative and the cancelling means operative, thereby to apply a new mark and cancel an old mark without cutting the ticket.

CARL A. FLOOD